United States Patent [19]
Esquivel et al.

[11] Patent Number: 6,083,473
[45] Date of Patent: Jul. 4, 2000

[54] SELECTIVE OXIDATION CATALYST, PREPARATION AND USE THEREOF

[75] Inventors: José Manuel Domínguez Esquivel, Cuautitlan Izcali; Amalia Tobón Cervantes, Cuautitlan Izcalli; Joaquín Lorenzo de los Santos, Delg. Gustavo A. Madero; Rafaela Hernández Hernández, Cuautitlan Izcalli; Oscar H. Bermúdez Mendizábal, Ciudad Satelite, all of Mexico

[73] Assignee: Instituto Mexicano Del Petroleo, Mexico City, Mexico

[21] Appl. No.: 09/065,448

[22] Filed: Apr. 24, 1998

[30] Foreign Application Priority Data

Apr. 25, 1997 [MX] Mexico .................................... 973042

[51] Int. Cl.$^7$ ..................................................... C01B 17/02
[52] U.S. Cl. ................................ 423/576.8; 423/244.01; 423/244.02; 423/244.04; 423/244.06; 423/244.09; 423/244.1; 423/573.1; 423/244.11; 502/80; 502/84
[58] Field of Search ........................... 423/244.1, 244.11, 423/571, 244.01, 244.02, 244.04, 244.06, 244.09, 573.1, 576.8; 502/80, 84

[56] References Cited

U.S. PATENT DOCUMENTS

| | | | |
|---|---|---|---|
| 3,235,512 | 2/1966 | Koepernik | 502/84 |
| 4,725,417 | 2/1988 | Deschamps et al. | 423/244 |
| 4,774,213 | 9/1988 | Schneider et al. | 502/84 |
| 4,995,964 | 2/1991 | Gortsema et al. | 208/112 |
| 5,356,847 | 10/1994 | Henderson | 502/84 |

*Primary Examiner*—Tom Dunn
*Attorney, Agent, or Firm*—Roylance, Abrams, Berdo & Goodman, L.L.P.

[57] ABSTRACT

A catalyst for selective oxidation of sulfur-containing compounds comprising a metal of Group VIIIA which forms an active metal oxide supported on a support comprising a laminar phyllosilicate, alone, or in combination with silica or alumina. Laminar phyllosilicate and silica impregnated with a metal of Group VIIIA which forms an active metal oxide that achieves a conversion in excess of 95 percent of hydrogen sulfide or acid gas selectively to elemental sulfur and water, respectively.

21 Claims, No Drawings

SELECTIVE OXIDATION CATALYST, PREPARATION AND USE THEREOF

FIELD OF THE INVENTION

This invention relates to a catalyst useful for selective oxidation of acid gases, and to the preparation and use of such catalyst. More particularly, the present invention relates to a catalyst useful for sulfur recovery by means of the selective oxidation of acid gases resulting from the Claus process.

BACKGROUND OF THE INVENTION

The so-called Claus process is commonly used to convert hydrogen sulfide to elemental sulfur.

A typical three converter-Claus plant, may report an efficiency in sulfur recovery of about 97 percent under optimal conditions. However, actual environmental legislation restricts $SO_2$ emissions levels to about 250 ppm/vol or its equivalent, in other words, a global recovery of 99 to 99.7 percent. To achieve such low emission of $SO_2$, an additional process is necessary for deep sulfur recovery to enable a more than 97 percent recovery using the Claus process, reducing in this way $SO_2$ emissions within the accepted limits. Such additional process is applied in a stage after the Claus process, and mainly consists in a selective oxidation to transform the remaining gas to elemental sulfur and water.

U.S. Pat. No. 4,818,740 describes the Claus process and discloses selective oxidation of sulfur-containing compounds resulting from the Claus process using a $Fe_2O_3$—$Cr_2O_3/\alpha$-$Al_2O_3$ catalyst in concentrations of 0.5 and 4.5 weight percent, respectively, achieving a conversion of acid gas to sulfur, above 90 percent. The disclosure of U.S. Pat. No. 4,818,740 is incorporated by reference in its entirety.

U.S. Pat. No. 4,311,683 discloses $H_2S$ conversion to sulfur, by the use of a vanadium oxide and vanadium sulfide catalyst supported on a porous oxide which is non-alkaline. The disclosure of U.S. Pat. No. 4,311,683 is incorporated by reference in its entirety.

SUMMARY OF THE INVENTION

A catalyst for selective oxidation of sulfur-containing compounds has been found comprising a Group VIIIA metal oxide supported on a support comprising a laminar phyllosilicate.

Surprisingly, it has been found that a catalyst composition comprising a Group VIIIA metal oxide on a support comprising a laminar phyllosilicate, alone, or in combination with silica or alumina, provides high catalytic activity for the conversion of $H_2S$ to elemental sulfur and water, from the Claus plant acid gas emissions. The present catalyst has the property of preventing sulfur oxidation to $SO_2$ without affecting any of the other gaseous compounds of the acid gas, such as COS, $CS_2$, $H_2$ and $CO_2$, and without promoting Claus equilibrium reactions. Additionally, the catalyst is not affected by high concentrations of water vapor or by oxygen in excess. The present catalyst is extremely selective for $H_2S$ oxidation at moderate temperatures, and provides in excess of 95 percent conversion levels of acid gas to elemental sulfur, and a sulfur recovery of at least 90 percent.

According to one embodiment of the invention, the support comprises high surface area silica enriched with a laminar phyllosilicate.

According to another embodiment of the invention, the support comprises alumina enriched with a laminar phyllosilicate.

According to another embodiment of the present invention, a method for preparing a catalytic composition for selective oxidation of $H_2S$ to elemental sulfur is provided comprising (a) activation of a support comprising a laminar phyllosilicate, (b) impregnation of said support with a precursor salt of a Group VIIIA metal which provides an active metal oxide phase, (c) drying said impregnated support, and (d) calcination of said dried support. The foregoing procedure provides the active phase, i.e., the metal oxide highly dispersed on the catalyst support.

According to a further embodiment of the present invention, a process for converting hydrogen sulfide to elemental sulfur is provided, which comprises contacting a gas comprising hydrogen sulfide and oxygen with a catalyst comprising a Group VIIIA metal oxide on a support containing a laminar phyllosilicate and silica.

The present invention distinguishes U.S. Pat. Nos. 4,311,683 and 4,818,740 not only in the use of an oxide of Group VIIIA, but, in addition, the catalyst support used in the present invention is significantly different.

DETAILED DESCRIPTION

The catalyst of the present invention is particularly useful for selective oxidation of sulfur-containing compounds, such as selectively converting hydrogen sulfide in acid gas to elemental sulfur, and comprises a Group VIIIA metal oxide supported on a support comprising a laminar phyllosilicate.

A laminar phyllosilicate is an aluminosilicate having a laminar structure, as does clay, for example. Such laminar structure is unlike other aluminosilicates, such as zeolites, which are tectosilicates and have a microporous structure. Laminar phyllosilicates are described in detail, for example, in an article by G. J. B. Mott, "Catalysis Today", No. 2, 1988, at pages 199–208, which article is hereby incorporated by reference in its entirety. The laminar phyllosilicates of the present invention have a three-layer structure and the swelling properties of a montmorillonite clay. Additional desired properties of laminar phyllosilicate include an interplanar spacing of between about 10 and about 18 Angstrom units, with a silicon to aluminum weight ratio of between about 1 and about 10, preferably between about 5 and about 10. Thus, the preferred laminar phyllosilicate is montmorillonite clay and those materials or clays having the properties of montmorillonite clay.

The catalyst support of the present invention may substantially entirely consist of a laminar phyllosilicate, such as montmorillonite clay. However, the present catalyst support may comprise between about 1 and about 15 weight percent laminar phyllosilicate, preferably between about 3 and about 15 weight percent phyllosilicate, with the remainder of the support being silica or alumina, such as corundum. A preferred support comprises a high surface area silica in the form of spheres or granules enriched with laminar phyllosilicates. Such material in the form of granules is commercially available from W. R. Grace & Company as Silica Gel 03, Type RD, Use Code A, for dehydration of natural gas and industrial gases.

The presence of laminar phyllosilicates in the granular silica provides the catalyst of the present invention with physical properties essentially different from those reported in literature, such as P. Van Nisselroov, *Catal. Env. Tech.*, Nov. 19–20, 1991 and from other referred patents and EPA 0409353AL Public number, Appl. No. 90201968.6 (23-01-91 Bull 91/04). For example, specific differences include moderate surface area of the prior support material, in contrast with the high surface areas of the present invention. Another specific difference is the lower concentration of active metal oxide catalyst of the present invention, which may be between 2.5 and 3.5 weight percent in contrast with higher values used in the patents referred to herein.

The support of the present invention preferably has a high surface area of at least about 500 m$^2$/g (N$_2$ BET), preferably between about 650 and about 750 m$^2$/g (N$_2$ BET), with between about 690 and about 775 m$^2$/g (N$_2$ BET) being especially preferred; for example about 715 m$^2$/g. Likewise, the support has a pore radius of from about 5 to about 50 or 60 Angstroms. Silica is a preferred support material having such properties.

The support is impregnated with an oxide of a metal from Group VIIIA of the periodic table, preferably, iron, nickel and/or copper in oxidation state III. An especially preferred metal compound is iron (III). Suitable amounts of the metal oxide are between about 0.1 and about 10 weight percent, preferably between about 2.5 and about 3.5 weight percent, based on the total weight of the catalyst.

The preparation of the catalyst of the present invention involves the following steps: (1) support activation, (2) impregnation of the support using a solution containing a salt of the Group VIII metal that will provide the active phase to the catalyst, (3) drying and (4) calcination.

Activation of the support is conducted by heating the support at a temperature of between about 100 and about 400° C., preferably between about 110 and about 130° C., for a period of between about 1 and about 4 hours. Next, the catalyst support is impregnated with an aqueous solution of the precursor salt, such as a lower alcohol-water solution comprising a C$_1$–C$_3$ alcohol, such as methanol, ethanol, or isopropanol, in an alcohol to water is ratio of from 0.8:1, to 1:1.2, preferably about 1:1. The precursor salt may be a nitrate, sulfate, chelate, perchlorate, oxalate or any other organic or inorganic salt of the Group VIIIA metal.

Suitable amounts of the salt solution, such as an iron salt, include amounts suitable to provide from about 0.1 to about 10 weight percent, preferably from about 2.5 to about 3.5 weight percent of the metal oxide, such as iron oxide based on the total catalyst weight.

Next, the impregnated catalyst support is dried under reduced pressure at a temperature of from about 50 to about 250° C. for a period of 24 to about 72 hours. Finally, the dried catalyst is calcined in an oxidative atmosphere at a temperature of between 300° and about 675° C., preferably between about 450° and about 550° C. for from about 1 to about 6 hours. The specific area of the impregnated catalyst support is between about 500 and 600 m$^2$/g.

If desired, the catalyst support may be calcined prior to impregnation in an oxidative atmosphere at a temperature of 300° to 650° C. for a period of about 3 to about 6 hours.

The present invention is considered an important advance in the field of H$_2$S selective oxidation for sulfur recovery. The catalyst of the present invention may be used for the selective oxidation of hydrogen sulfide under any suitable conditions. Thus, for example, a gas containing hydrogen sulfide, such as an acid gas feed containing 3 to 5 mole percent hydrogen sulfide and 20 to 30 mole percent water, may be contacted at a temperature in the range of from about 220° C. and about 260° C., preferably from about 240° to about 250° C. using a nitorgen carrier gas, in amounts, for example, of 65.5 to 72 mole percent, at a space velocity (GHSV) of from about 100° to about 1500 h$^{-1}$ under ambient pressure, e.g., 1 atmosphere.

The invention will be further illustrated by the following examples. All percentages are by weight unless otherwise specified. It should be understood that it is not intended to limit the scope of this invention.

EXAMPLE 1

Silica containing 4 weight percent laminar phyllosilicate in the form of ³⁄₁₆" average diameter spheres having a high surface area of 726 m$^2$/g, a pore volume of 0.39 cm$^3$/g and a pore diameter of 21 Angstroms is subjected to a drying pretreatment and at a temperature of 130° C. for a period of 3 hours.

Next, a 1:1 methyl alcohol-water solution of iron (III) nitrate is added, and the impregnated catalyst heated at 130° C. under reduced pressure for 72 hours to evaporate the solvent. Finally, it is calcined in an oxidative atmosphere at a temperature of 500° C.

The resulting catalyst prepared under this procedure had an average conversion of H$_2$S to sulfur of 40 weight percent at 250° C., with a GHSV of 1000 h$^{-1}$.

EXAMPLE 2

The procedure of Example 1 was repeated except with the variation of calcining the support at 500° C. for a period of 3 hours prior to impregnation.

EXAMPLE 3

Following the procedure of Example 1, enriched granular silica with 4 weight percent laminar phyllosilicate was used. The catalyst had a surface area of 733 m$^2$/g, a pore volume of 0.3866 cm$^3$/g and a pore size of 21 A.

EXAMPLE 4

The procedure of Example 2 was repeated using the enriched granular silica with laminar phyllosilicate of Example 3.

EXAMPLE 5

Using as support enriched granular silica, as mentioned on Examples 3 and 4, a drying treatment is applied between a temperature of 130° C., for a period of 3 hours. Impregnation is performed at room temperature using a 1:1 methanol-water solution containing iron citrate (III), in a concentration of 3 weight percent iron in relation to the support, while heating for 3 hours. Next, solvent is eliminated completely and the resulting material dried at 130° under reduced pressure, for a period of 72 hours. Finally, calcination is proceeded in oxidative atmosphere at 500° C.

The resulting catalysts are evaluated at a bench scale oxidation reaction of acid gas to elemental sulfur and water, operating at 240° C. with a GHSV of 1000 h$^{-1}$. The reported conversion averaged 95% for at least 50 hours.

EXAMPLE 6

Using as support the mentioned granular silica established in Examples 3 and 4, this is activated at 130° C. for a period of 3 hours, after which is impregnated with an iron citrate solution, having 3 weight percent iron. Heating is kept for 3 hours, and the solvent is evaporated at temperatures of 130° C., at a reduced pressure, for a period of 72 hours. Finally, it is calcined in oxidative atmosphere at 500° C. The resulting catalyst enables catalytic activity in the conversion of acid gas to elemental sulfur at a conversion greater than 95 percent based on the acid gas introduced with the feed at a temperature of 240° C. and with a GHSV of 1000 h$^{-1}$, under bench scale conditions.

What is claimed is:

1. A catalyst for selective oxidation of sulfur-containing compounds comprising a Group VIIIA metal oxide supported on a support consisting essentially of silica and a laminar phyllosilicate, said silica having a surface area of at least about 650 $m^2$/gram.

2. The catalyst of claim 1, wherein said laminar phyllosilicate has a three-layer structure and the swelling properties of montmorillonite clay.

3. The catalyst of claim 1, wherein said support comprises between about one and about 15 weight percent laminar phyllosilicate with the remainder being said silica.

4. The method of claim 3, wherein said support comprises between about 3 and about 15 weight percent phyllosilicate.

5. The catalyst of claim 1, wherein said catalyst contains between about 0.1 and about 10 weight percent of said Group VIIIA metal oxide.

6. The catalyst of claim 5, wherein said catalyst contains between about 2.5 and about 3.5 weight percent of said Group VIIIA metal oxide.

7. The catalyst of claim 6, wherein said Group VIIIA metal oxide is iron oxide.

8. The catalyst of claim 1, wherein said silica has a surface area between about 690 and about 775 $m^2$/gram.

9. The catalyst of claim 8, wherein said silica has a surface area of between about 690 and about 750 $m^2$/gram.

10. The catalyst of claim 1, wherein support is in the form of granules of said silica enriched with laminar phyllosilicates.

11. A method for preparing a catalytic composition for selective oxidation of $H_2S$ to elemental sulfur, comprising (a) activation of a support consisting essentially of silica and a laminar phyllosilicate, said silica having a surface area of at least 690 $m^2$/gram, (b) impregnation of said support with a precursor salt of a Group VIIIA metal, (c) drying said impregnated support, and (d) calcining said dried support.

12. The method of claim 11, wherein said impregnation is conducted using an aqueous solution of the precursor salt selected from the group consisting of nitrates, chelates and oxalates of said Group VIIIA metal.

13. The catalyst of claim 11, wherein said silica has a surface area between about 690 and about 775 $m^2$/gram.

14. The catalyst of claim 13, wherein said silica has a surface area of between about 690 and about 750 $m^2$/gram.

15. The method of claim 11, wherein said support comprises between about 3 and about 15 wt % phyllosilicate.

16. The catalyst of claim 11, wherein support is in the form of granules of said silica enriched with laminar phyllosilicates.

17. A process for the conversion of hydrogen sulfide to elemental sulfur, which process comprises contacting hydrogen sulfide and oxygen with a catalyst comprising a metal of Group VIIIA supported by a catalyst support comprising a phyllosilicate.

18. The process of claim 17, wherein said support comprises silica or alumina and a phyllosilicate.

19. The process of claim 17, wherein said conversion is conducted at a temperature of from about 220° C. to about 260° C.

20. The process of claim 17, wherein said support consists essentially of silica and a laminar phyllosilicate.

21. The process of claim 20, wherein said silica has a surface area of at least 690 $m^2$/gram.

* * * * *